3,370,084
ESTERS OF 2-METHYL-4-CHLOROPHENOXY
ALKANOIC ACIDS
Masayoshi Hatanaka, Takaaki Ohtsuka, and Katsumichi
Aoki, Nakoso-shi, Japan, assignors to Kureha Chemical
Industry Co., Ltd., a corporation of Japan
No Drawing. Filed Nov. 16, 1964, Ser. No. 411,630
Claims priority, application Japan, Nov. 18, 1963,
38/61,984
4 Claims. (Cl. 260—473)

ABSTRACT OF THE DISCLOSURE

Weed killing agent of the formula

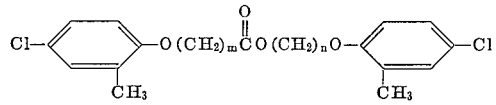

wherein $m$ and $n$ are integers between 1 and 5.

The following specific weed killing agents of the generic formula are disclosed:

2 - methyl - 4 - chlorophenoxy ethyl-2-methyl-4-chlorophenoxy acetate; 2 - methyl - 4 - chlorophenoxy ethyl-2-methyl-4-chlorophenoxy butyrate; 2-methyl-4-chlorophenoxy butyl-2-methyl-4-chlorophenoxy acetate.

---

This invention relates to new and useful weed-killing substances.

Various chemical compounds having efficient weed-killing ability have been hitherto known, of which 2,4-dichlorophenoxy acetic acid or briefly 2,4-D; 2-methyl-4-chlorophenoxy acetic acid or briefly MCPA and the like are known as the representative hormone weed killers.

Some of these weed killers, when applied to cultivated fields for cultured plants such as, for instance, aquatic rice plants, provides adverse influence to them, such as considerable development of malformed leaves. In this respect, MCPA shows none of such defects so that it may be safely applied to the cultivation of the rice plant during the initial and middle stage of its growth.

We directed our grave attention to the superior weed-killing performance of MCPA which cannot be obtained with use of other known compounds and intended to improve still further its performances such as physical and chemical stability in the treatment of the said agent, the suppressing power upon possible postemergence of malformation of cultured plants upon applied and the high penetrating power to weeds or seeds thereof, so as to accelerate the weed-killing power of available chemical compounds in the art.

For this purpose, we have synthesized a number of new derivatives from 2-methyl-4-chlorophenoxy aliphatic carboxylic acids and a vast investigation was made into the comparative weed-killing effects of these new derivatives.

It was now found that those esters are highly useful as the weed killers which may be prepared by such a process that 2 - methyl - 4 - chlorophenoxy acetic acid, 2-methyl-4-chlorophenoxy butyric acid, 2-methyl-4-chlorophenoxy capronic acid or the like compound is condensed in a suitable inert solvent and in the presence of a suitable catalyst such as sulfuric acid with 2-methyl-4-chlorophenoxy ethanol, 2-methyl - 4 - chlorophenoxy butanol or 2-methyl-4-chlorophenoxy pentanol while the water as produced is being removed from the reaction system. Such esters are also useful which may be produced in such way that a mixture of 2-methyl-4-chlorophenoxy methyl chloride with sodium salt of a corresponding 2-methyl-4-chlorophenoxy aliphatic carboxylic acid is heated in its anhydrous state in nitrogen atmosphere to 200–230° C. These esters corresponding to those having the following general formula when $n$ is assumed to be unit.

These new esters or ω-[2-methyl - 4 - chlorophenoxy]-alkyl esters of ω-[2-methyl - 4 - chlorophenoxy]-aliphatic carboxylic acids may be expressed by the following general formula:

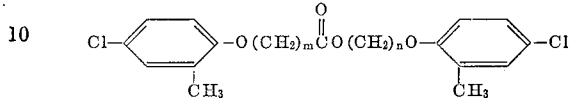

wherein $m$ and $n$ are integers 1–5. These esters show different oily consistencies at the room temperature or are in the form of solid crystals, as the case may be. These new compounds are of the doubled-2-methyl - 4 - chlorophenoxy type and surprisingly superior in their weed-killing performance in comparison with conventional comparative esters.

The novel weed killers according to the invention are highly stable in their desired killing power and, upon applied, the agricultural yields from the protected culture plants may be favorably influenced to a considerable degree. No fears are encountered while in their use of the toxicity upon human beings, animals and fishes. The way of application of the weed killers may be through soil treatment or direct application to weeds. It is easy to prepare ready-for-use agents in the form of powders, granules, pellets, aqueous solutions, suspensions, pastes, emulsions, oil dispersions or the like.

These weed killers according to this invention are very cheap in their price and highly effective on a large number of weeds such as, for instance, *Lindernia pyxidaria* All. (false pimpernel); *Monochoria vaginalis* Presl. (pickerelweed); *Lobelia radicans* Thumb. (lobelia); *Rotala indica* Koehne; *Callitriche fallax* Petrov; *Stellaria media* Cyr. (chickweed); *Stellaria uliginosa* Murr.; *Alisma canaliculatum* A. Broaun et Bouche. (deil's spoons); *Sagittaria pygmae* Miq. (adlleis tongue); *Centipeda minima* O. Kuntze (sneezeweed); *Eclipta alba* Hassk (American false daisy); *Dopatorium junceum* Hamilt; *Oenanthe stolonifera* DC. (dropwort); *Elatine orientalis* Makino (waterwort); *Cardemine flexuosa* Withering; *Ranunculus sceleratus* L.; *Polygonum blumei* Meison (smartweed); *Rumex japonicus* Meisn. (curlydock); *Aneilema keisak* Hassk; *Fimbristylis squarrosa* Vahl; *Portulaca oleracea* L.; *Calystegia hederacea* Wall; *Acalypha australis* L.; *Artemisia vulgaris* L.; *Cyperus difformis* L. and the like, which can be killed totally with a minimum dose of 5 g./a. of any one of the said weed-killing esters as the effective agent.

A further group of weeds such as *Plantago major* Linn. (plantain); *Carex thunbergii* Steud.; *Cyperus microiria* Steud. (cypress grass); *Cyperus iria* L.; *Cyperus serotinus* Rottb.; *Eleocharis acicularis* R. Br.; *Cyperus rotundus* L. and the like may be effectively killed upon treatment with a minimum dose of 10 g./a. of any one of the said new esters as the effective agent.

A still further group of weeds such as *Eleocharis tuberosa* Roem et Schult; *Potamogeton franchetii* A. Benn. et Baag; *Spirodela polyrhiza* Schleid (giant duckweed); *Panicum crus-galli* L. var. *submutica* Mey; *Echinochloa hispidula* var. *hispidula* Honda; *Digitaria ciliaris* Pers. (crabgrass); *Setaria viridis* Beauv.; *Alopoculus aequalis* Sobol (for tail); *Beckmannia erucaeformis* Host and the like may be killed effectively upon treatment with a minimum dose of about 15 g./a. of any selected one of the said new esters as the effective agent.

The process for the preparation of the new esters according to this invention will be described more in detail hereinbelow by way of several preferred examples:

EXAMPLE 1

*Preparation of 2-methyl-4-chlorophenoxy ethyl-2-methyl-4-chlorophenoxy acetate*

93.3 g. of 2-methyl-4-chlorophenoxy ethanol, 100.3 g. of 2-methyl-4-chlorophenoxy acetic acid, 200 ml. of pure benzene and several drops of concentrated sulfuric acid (90%) are introduced into a 500-ml. three-necked-flask fitted with a reflux condenser and heated to boil for about 8 hours while refluxed, until substantially no more water is condensed after 9 ml. of water has been separated. Upon cooled to the room temperature, the reacted liquid phase is transferred into a separating funnel. The liquid is washed three times each with 100 ml. of 10% aqueous solution of sodium carbonate and then again three times each with 100 ml. of distilled water. The benzene phase is dried by means of anhydrous sodium sulfate and transferred to a distillation still. After distilling off the benzene at a reduced pressure and still continued distillation at a highly reduced pressure 3 g. of 2-methyl-4-chlorophenoxy ethyl-2-methyl-4-chlorophenoxy acetate is obtained. B.P. 203–207° C./0.05 mm. Hg; M.P. 48–49° C.

EXAMPLE 2

*Preparation of 2-methyl-4-chlorophenoxy ethyl-2-methyl-4-chlorophenoxy butyrate*

93.3 g. of 2-methyl-4-chlorophenoxy ethanol, 123.5 g. of 2-methyl-4-chlorophenoxy butyl chloride, 150 ml. of chloroform and several drops of pyridine are introduced into a 500-ml. round-bottom flask and gradually heated while refluxed by carefully observing the development of hydrochloric acid until the development finally ceases. After continued distillation under reduced pressure so as to distill off the chloroform, the reaction mixture is subjected to still further distillation in vacuo until an oily viscous and colorless substance, 196 g., is obtained. B.P. 226–229° C./2 mm. Hg, $H_D^{28}$ 1.5501.

2 - methyl - 4 - chlorophenoxy butyl-2-methyl-4-chlorophenoxy acetate and the like may be obtained in a similar manner as set forth in Examples 1 and 2.

EXAMPLE 3

19.0 g. (0.1 mol) of 2-methyl-4-chlorophenoxy methyl chloride and 25.1 g. (0.1 mol) of sodium salt of 2-methyl-4-chlorophenoxy lactic acid are introduced into a 200-ml., three-necked flask fitted with agitator, cooling tube and gas inlet tube and mixed thoroughly. The flask is then dipped in an oil bath kept at a temperature of about 150° C. and subjected to agitation. The bath temperature is elevated gradually until 220° C. and the reaction is carried into effect at this temperature under nitrogen atmosphere for about 5 hours.

After completion of the reaction, the reaction mixture is cooled to the room temperature and a black, oily substance is extracted with ether. The ether phase is then washed with an alkaline solution and distilled water, dried with anhydrous magnesium sulfate, distilled the ether off and subjected to distillation in vacuo. A slightly yellow-colored, viscous liquid substance, 33.7 g., is finally otbained with a yield of 88% of the theoretical. B.P. 219–222° C./2 mm. Hg. When cooled the oil solidifies at 61–62° C.

Other esters corresponding to the aforegiven general formula with n being unit may be successfully prepared in analogous way to Example 3.

Several examples of weed killer compositions with said new and useful esters will be given hereinbelow only by way of example.

EXAMPLE 4

| | G. |
|---|---|
| 2 - methyl-4-chlorophenoxy ethyl-2-methyl-4-chlorophenoxy acetate, as effective agent | 2.5 |
| Bentonite and talc | 97 |
| "Triton X–120" (surfactant, alkyl aryl polyether alcohol produced by Rohm & Haas Co., Washington Square, Philadelphia 5, Pa.) | 0.5 |

A small quantity of water is added to the mixture of the said constituents for the preparation of pellets and paste is extruded through a nozzle and transformed into small pellets of about 1 mm. diameter in a pellet machine, and dried in a conventional manner.

EXAMPLE 5

*Preparation of weed killer composition "B"*

| | G. |
|---|---|
| 2 - methyl-4-chlorophenoxy ethyl-2-methyl-4-chlorophenoxy butyrate, as effective agent | 25 |
| "Triton X–151" (surfactant, a blend of alkyl aryl polyether alcohol with an organic sulfonate, produced by Rohm & Haas Co.) | 15 |

To the above constituents a proper quantity of xylene was added so as to provide 1 ml. of a crude fluid mixture which is then thoroughly mixed into an evenly distributed emulsion ready for use as weed killer.

Instead of "Triton X–151," "Triton X–16," or "Triton X–171" may equally be used.

EXAMPLE 6

*Preparation of weed killer composition "C"*

| | G. |
|---|---|
| 2 - methyl-4-chlorophenoxy butyl-2-methyl-4-chlorophenoxy acetate as effective agent | 2 |
| "Triton X–155" (spreader, alkyl aryl polyether alcohol, produced by Rohm & Haas Co.) | 0.3 |

A proper quantity of kerosene is added so as to provide 1 ml. of a crude fluid mixture which is then thoroughly mixed into an evenly distributed homogenized oil dispersion ready for use as weed killer.

EXAMPLE 7

*Preparation of weed-killing composition "D"*

| | G. |
|---|---|
| 2 - methyl-chlorophenoxy ethyl-2-methyl-4-chlorophenoxy acetate as effective agent | 2.5 |
| BHC (7–14%) | 35 |
| "Triton X–120," surfactant | 2.5 |

The above constituents are mixed together, finely divided in a crusher, passed through a 200-mesh screen and finally hydrated by adding a small quantity of water.

For showing the superior weed-killing power of the new esters according to the present invention, several further examples will be given below only by way of example:

EXAMPLE 8

The aforementioned composition "A" in the form of pellets, 300 g./a., is dispersed on a rice-field after plantation of young paddy plants. Examined after a month, the growth of weeds was found to be less than 1/10 the otherwise estimated green weight 197 g./m.² thereof, without giving none of adverse effect upon the growth of the rice-plants. Especially superior killing effect of the weed killer was observed on *Lindernia pyxidaria* All., *Monochoria vaginalis* Presl, *Rotala indica* Koehne, *Sagittaria pygmaea* Mig., *Elatine orientalis* Makino, *Dopatorium junceum* Hamilt., *Eleocharis acicularis* R. Br., *Cyperus japonica* Miq., and the like. With the above-specified dose, such as *Potamogeton franchetii* A. Benn. et Baag. and *Eleocharis tuberosa* Roem and Schult have been remained alive to a certain degree. The rice yield increased about 20% based upon the otherwise estimated crops of 437 kg./10 a.

EXAMPLE 9

The composition "B" in the form of emulsion was added with water into a 20-times diluted suspension, and sprayed in a dose of 5 l./a. upon a field directly after seeding of upland rice-plants. Examined after one month, it was found that the otherwise estimated green weight of weeds, 247 g./m.$^2$, was reduced to a value less than ⅕, without giving any appreciable adverse effect upon the growth of the cultured plants. Superior killing effect of the effective agent was observed upon *Centipeda minima* O. Kuntze, *Eclipta alba* Haask, *Cyperus microiria* Steud., *Setaria virdis* Beauv., *Polygonum blumei* Meison, *Digitaria ciliaris* Pers., *Panicum crusgalli* L. var. *submutica*, and the like. The rice yield increased to about 220%-gain based upon the otherwise estimated crops of 167 kg./10 a., non-polished.

EXAMPLE 10

A dose of 9.5 l./a. of the weed killer composition "C" in the form of oil dispersion was applied onto the soil of a field seven days before plantation of sugar-cane. Upon examined one month thereafter, it was found that the otherwise estimated green weight of weeds, 224 g./m.$^2$, has been reduced to a value less than ⅛, with only a negligibly small amount of adverse effect upon the cultivating plants. Increase in the sugar-cane yield was a 30%-gain based upon the otherwise estimated value of 1.7 tons/10 a. Superior killing power of the agent was observed upon *Digitaria ciliaris* Pers., *Panicum crusgalli* L. var. *submutica* Mey., *Eclipta alba* Hassk, *Cyperus microiria* Steud., *Polygonum blumei* Meisn., *Portulaca oleracea* L., *Acalypha australis* L., *Calystegia hederacea* Wall., *Cyperus rotundus* L., and the like.

EXAMPLE 11

The hydrated, weed-killing and insecticidal composition "D" was distributed in the middle of June over the soil of a mulberry field in a dose of 400 g./water, 4 l./a. Examination after one month, it was found that the green weight of weeds was reduced to a value less than ⅕ the otherwise estimated figure: 239 g./m.$^2$, the fly on the plant was also reduced to less than ⅕. The growth-checking effect was negligibly slight. Yield of mulberry leaves increased by 30% in comparison with an otherwise estimated figure of 730 kg./10 a.

The reason why the weed killers according to this invention are highly effective upon a vast variety of weeds is attributable to their improved penetrating power to weeds, elongated effective duration term in the soil, strengthened effective power on plants, and the like.

Since the weed-killing substance according to this invention are chemically relatively stable, they are usable in the form of mixtures or compositions with other conventional weed killers, insecticides, fungicides, repellants, attractants, driers, solid and liquid fertilizers, emulsifiers, spreaders, weighting substances, solvents or the like, or any selected combination thereof.

It is to be understood that the above-described examples are only illustrative of the application of the principles of the invention. A number of changes and modifications may be devised by those skilled in the art without departing from the spirit and scope of the invention as set forth in the appended claims.

What is claimed is:

1. Weed-killing agent having a general formula:

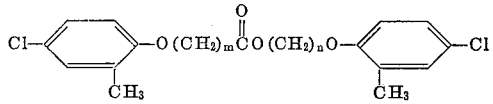

wherein *m* and *n* are integers 1–5.

2. Weed-killing agent having a formula: 2-methyl-4-chlorophenoxy ethyl-2-methyl-4-chlorophenoxy acetate.

3. Weed-killing agent having a formula: 2-methyl-4-chlorophenoxy ethyl-2-methyl-4-chlorophenoxy butyrate.

4. Weed-killing agent having a formula: 2-methyl-4-chlorophenoxy butyl-2-methyl-4-chlorophenoxy acetate.

References Cited

UNITED STATES PATENTS 2,648,701   8/1953   Begin et al. _____ 260—473

OTHER REFERENCES

Wagner et al.: "Synthetic Organic Chemistry" (1953), p. 484.

LORRAINE A. WEINBERGER, *Primary Examiner.*

RICHARD K. JACKSON, *Examiner.*

S. B. WILLIAMS, D. STENZEL, *Assistant Examiners.*